United States Patent [19]

Batson et al.

[11] Patent Number: 5,118,532
[45] Date of Patent: Jun. 2, 1992

[54] METHOD OF PRODUCING DECORATIVE VERTICAL LOUVER WINDOW COVERING MATERIAL AND DECORATIVE VERTICAL LOUVER MATERIAL SO PRODUCED

[75] Inventors: Ann H. Batson, Anderson; J. Bennett Billings, Starr; D. Gregory Royster, Belton, all of S.C.

[73] Assignee: VyTech Industries, Inc., Anderson, S.C.

[21] Appl. No.: 662,285

[22] Filed: Feb. 28, 1991

Related U.S. Application Data

[63] Continuation-in-part of Ser. No. 485,608, Feb. 27, 1990, abandoned.

[51] Int. Cl.$^5$ .......................... B05D 3/02; B05D 5/00
[52] U.S. Cl. ..................... 427/278; 427/316; 427/365; 427/393.5; 427/398.1; 428/290
[58] Field of Search ............. 427/209, 278, 340, 341, 427/389, 316, 393.5, 398.1, 365; 428/290

[56] References Cited

U.S. PATENT DOCUMENTS

| | | | |
|---|---|---|---|
| 3,844,813 | 10/1974 | Leonard et al. | 118/118 X |
| 4,062,989 | 12/1977 | Long | 427/176 |
| 4,312,914 | 1/1982 | Guth | 428/290 |
| 4,590,102 | 5/1986 | Rosamilia et al. | 427/374.1 |
| 4,595,617 | 6/1986 | Bogdany | 428/95 |

Primary Examiner—Michael Lusignan
Attorney, Agent, or Firm—Dority & Manning

[57] ABSTRACT

A method of producing decorative web from nonwoven polyester web includes heat setting the web at a temperature between 390 and 410 degrees Farenheit before applying a pigmented, solvent soluble, thermoplastic resin composition to at least one side of the web. The composition can include a polymer solution, which includes a vinyl polymer such as one or both of a polyvinyl chloride homopolymer resin and a polyvinyl chloride acetate copolymer resin, a solvent, plasticizers, heat stabilizers, light stabilizers, pigments and antistats. The composition also preferably may include fillers, soil repellents, and flame retardants. The composition is applied by a knife-over-roll apparatus, a rotogravure printer, or other conventional applicating apparatus. After the composition is applied, the web is passed through a hot air oven maintained at a temperature in the range of from about 230° F. to about 330° F. to dry the web of solvent and cure the composition to form solids in the web. The web can be embossed by passing the web through a conventional embossing apparatus that has been specially modified to include a backup roll to the embossing roll wherein the Shore A hardness of the backup roll is at least 90. The web so produced has a basis weight in the range of from about 3.5 ounces per square yard to about 15 ounces per square yard and includes cured composition solids which include a polyvinyl chloride/vinyl acetate copolymer resin, a polyvinyl chloride resin, plasticizers, stabilizers, antistats, and pigments. Applying standard commercial acceptance tests for louver material, the maximum shrinkage was 1/16", maximum stretch was 1/16", the maximum twist was 5 degrees, lightfastness was at least 200 hours, and no waviness, cupping, crocking or unacceptable mottling was observed.

16 Claims, 6 Drawing Sheets

METHOD OF PRODUCING DECORATIVE VERTICAL LOUVER WINDOW COVERING MATERIAL AND DECORATIVE VERTICAL LOUVER MATERIAL SO PRODUCED

BACKGROUND OF THE INVENTION

This application is a continuation-in-part application to parent application Ser. No. 07/485,608, filed Feb. 7, 1990, now abandoned, which parent application is hereby incorporated herein by this reference.

The present invention relates to a method of producing a superior nonwoven vertical louver material and to such louver material, and more particularly to a method of coloring, rigidifying, and embossing a web of nonwoven stitchbond polyester material to form vertical louver material and to the decorative vertical louver material so formed.

The window covering industry is constantly seeking new ways of achieving novel decorating products. The commercial acceptability of a vertical louver product is measured by a compilation of specifications from leading distributors in the window covering market such as Louver drape, Hunter Douglas, Graber, and Kirsch. The specifications pertain to vanes of the louver material measuring 8 feet long and from 2 to 5 inches wide. The test vanes are hung in commercial louver hanging hardware racks and have weights inserted as ballast in the bottom of each vane. One ounce of weight per inch of vane width is used as ballast. The vanes are subjected to various environmental conditions as described below, and tested for twisting, cupping, shrinkage, waviness, stretching, lightfastness, and crocking. Twist is the tendency of a vane to rotate on its axis when suspended. Twist is measured using a protractor on a parallel surface and determining the amount of twist from the center of the vane. Cup is the arc formed across a vane when suspended. A machinist's scale is used for measurement. Shrinkage is a reduction in length of a vane to the original length. Stretch is an addition in length of a vane to the original length. Waviness is the tendency of a vane to pucker while hanging. Any visible waviness on either edge or in the louver after 24 hours is unacceptable. The product must hang straight. Lightfastness and crocking pertain to the vane's color. Minimum lightfastness as measured according to American Association of Textile Chemists and Colorists Test Method 16A, Carbon Arc Lamp, Continuous Light has been specified as 80 hours, class 5. Colorfastness to crocking as measured by Federal Test Method Standard 191 Method 5750 wet and dry should show no crocking.

Test vanes are hung in a controlled environmental test chamber where they are exposed to varying degrees of humidity and temperature cycles, then measured for the specification parameters. Before testing, each test louver vane is hung with ballast for 24 hours at standard ambient conditions. Test louver vanes are subjected to changes in environmental conditions for at least one hour for each of the following conditions:

| Temperature +/−3 degrees F. | Relative Humidity +/−5% |
| --- | --- |
| 75 | 50 |
| 65 | 95 |
| 100 | 90 |
| 65 | 30 |
| 100 | 30 |

| Temperature +/−3 degrees F. | Relative Humidity +/−5% |
| --- | --- |
| 75 | 50 |

Vane material may also be subjected to a daytime high temperature of 160 degrees Fahrenheit and a nighttime low temperature of 60 degrees Fahrenheit and a relative humidity ranging from 40%–70% for a period of five working days.

The following is an example of the testing and specifications that the vertical louver product must meet to be considered for a 3.5 inch wide louver:

| Test | Specification |
| --- | --- |
| twisting | maximum 10 degrees |
| cupping | maximum ⅛ inch |
| shrinkage | maximum 1/16 inch |
| waviness | none visible after 24 hrs. |
| stretching | maximum ⅛ inch |
| lightfastness | 80 hours |
| crocking | None |

Aqueous coatings have been applied to nonwoven and woven fabrics by kiss coating, pad coating, reverse roll coating, etc. U.S. Pat. No. 4,590,102 to Rosamilia et al and U.S. Pat. No. 4,312,914 to Guth are examples.

A polyester nonwoven web has been dyed and finished with a resin coating to yield a colored fabric with adequate rigidity and dimensional stability to function as the vertical louver vane for a blind or as material for a shade. The resin finish coating usually is applied by means of the conventional dip and squeeze process, or by the pad process.

The conventional dyeing processes include: (1) piece dyeing, placing large rolls of fabric into jigs or dyeing vats where they are treated with a dispersed dye solution; and (2) pad dyeing, passing a run of fabric through a solution dispersed dye and other finishes and then between pads to expel the excess finish. Pigments or dyes may tend to migrate within the fiber matrix or within the aqueous matrix.

Several problems are encountered when using the conventional methods of dyeing nonwoven fabrics. First, the formation of a nonwoven web from the individual fibers typically results in density variations in the web. When light is reflected from or transmitted through the web, the higher density portions have a darker appearance than the lower density portions. Such irregularities have been described as "blotching," "mottling" and "cloud printing." Dyeing the web intensifies the mottled appearance by further darkening the dark areas relative to the light areas in the dyed web. This color nonuniformity is aesthetically unpleasant to the viewer, and thus it is undesirable in a finished product.

A second problem encountered when dyeing nonwoven fabric with conventional dyeing processes is the unacceptable color variance that occurs between different lots. This problem stems from the difficulty of maintaining color control with dyes. A third problem, namely, unacceptable variance of color within a single lot, results from inadequate dispersion of the pigment or dye. Moreover, in a vat dyeing process, variable dye penetration or dispersion within the roll may produce unacceptable color variation over a single roll of cloth. For example, the color of the web wrapped near the outer portion of the roll may differ from the color of the web wrapped near the inner portion of the roll. Color fading presents yet another problem. Fade testing has demonstrated that the color in the conventionally dyed nonwoven polyester web typically fades after no more than about 80 hours of exposure to sunlight.

Acrylic finished stitchbonded nonwoven fabrics are extensively used in the window coverings industry to fill the need for a low cost vertical blind. However, styling opportunities available to stitchbonded nonwoven fabric are limited by the range of the stitchbonding equipment, i.e., one bar, two bar, etc. Versatility and decorating options are limited. Accelerated lightfastness testing of these conventional products yielded lightfastness results ranging from 20 to 100 hours. As schematically represented in FIG. 2 by the designating numeral 52, the conventional product also exhibits a mottling or spotted appearance related to the variation in web density. Aqueous acrylic coatings accentuate this undesirable mottling appearance by the dye/pigment pickup differences which vary according to the density of different portions of the web.

The conventional shade or louver material comprising a dyed polyester web with an acrylic finish can be pleated or slit and can be decorated by adding pigment either flexigraphically, by transfer printing, or by rotogravure. However, this louver material is difficult to emboss using conventional in-line finishing processes. Heating such material to temperatures of about 290° F. for embossing destroys the effect of the resin finish, and with it, the stiffness necessary to render the web sufficiently rigid and dimensionally retentive for use as louver material or shade material. For example, such conventional products (including stitchbonded products) have shown inadequate resistance to cupping and twisting. Also, the conventional stitchbonded acrylic coated products embossed by conventional methods using heat and pressure, have shown problems with their ability to hold a deep emboss. While plastisol coatings can hold an embossed pattern, plastisol coatings normally sit on top of the nonwoven substrate material, and embossing merely imprints the plastic coating and may not impart a pattern to the underlying fabric substrate. Thus, the finished louver gives the undesirable appearance of a plastic louver rather than a cloth appearance.

Regulations in certain markets have increased the need for a product which has color on one side and white on the other. To produce such product from a conventionally colored fabric requires the additional lamination of a film to one side of the material or the additional application of a foam, typically latex, to one side of the material. Each of these methods of providing a white backing significantly increases the cost of the finished product. Moreover, these products typically suffer from problems such as delamination of the film or foam from the substrate with extensive use, instability of the film or foam with exposure to heat and ultraviolet radiation, and the foam's inconsistent resistance to abrasion.

A clear, polymer solution has been applied to woven and nonwoven fabrics such as fiberglass, acrylics, cotton, and polyester. The formulation of the clear, polymer solution in weight percentages is: 41% methylethyl ketone, 20.6% toluene, 7.1% methyl isobutyl ketone, 6.1% polyvinylchloride (PVC) resin, 18.5% vinyl acetate polyvinylchloride copolymer, 6.0% isodecyldiphenylphosphate, and 0.7% heat stabilizer. Such formulations have been applied using a knife-over-roll apparatus. However, a need has arisen for a method of producing louver products that: (1) unlike dyeing, introduces a stable form of color and/or opacity into such products; (2) does so quickly; (3) does so cost effectively; (4) yields products that have superior lightfastness properties; (5) is capable of producing totally different colors on opposite sides of the product; (6) does not involve costly lamination procedures; (7) does not yield a product that suffers from delamination problems; (8) yields products that can be embossed and hold a deep embossed pattern; (9) yields a product that exhibits a cloth-like appearance rather than a plastic-coated appearance; and (10) reduces the mottling of the product to an aesthetically acceptable level.

OBJECTS AND SUMMARY OF THE INVENTION

It is a principal object of the present invention to provide a method of producing a decorative nonwoven vertical louver material that overcomes the problems identified above.

It is also a principal object of the present invention to provide a quick and cost effective method of producing an embossed nonwoven louver material that retains a cloth-like appearance while introducing stable forms of totally different color and/or opacity into opposite sides of the material.

It is a further principal object of the present invention to provide an embossed nonwoven louver material that retains a cloth-like appearance and has stable forms of totally different color and/or opacity in its opposite sides.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a method for producing louver material from a nonwoven polyester web comprises the step of providing a heat set nonwoven web of polyester material. The nonwoven web of polyester containing material can have a basis weight in the range of about 1.5 ounces per square yard (oz/sqyd) to about 10 oz/sqyd. The nonwoven web preferably consists of a polyester fabric with a minimum basis weight of 6.0 oz/sqyd. While fabrics of lesser weight may be used, product quality may suffer depending on the decorative steps chosen. It is possible to begin the process with a web of nonwoven polyester fabric that has already been heat set by the supplier of the fabric. The nonwoven web preferably has been heat set at a temperature in the range of from about 390 to 410 degrees Fahrenheit. Heat setting at lower temperatures allows too much shrinkage of the final product when exposed to environmental testing. If the web has not been heat set by the supplier of the web, then it can be heat set by mounting it on tenter pins and heating it at a temperature in the range of from about 390 to 410 degrees Fahrenheit. The web can be stitchbonded for purposes of reinforcing the web. Heatsetting the web should occur after the stitchbonding has been completed.

The method of the present invention further comprises the step of applying a pigmented, solvent soluble, thermoplastic resin composition to both opposite planar surfaces of the nonwoven web. The pigmented, solvent soluble, thermoplastic resin composition can be applied to each of the surfaces of the heat set web by using a conventional application apparatus such as a knife-over-roll apparatus, a reverse roll coating head, a rotary screen, a flood-coating head, an engraved rotogravure coating head, etc. The composition initially contacts the upper surface of the web, and pressure is applied to the composition to force it into the interstices of the nonwoven material forming the web. Excess composition is removed from the upper surface of the web. Thus, the composition penetrates into the interstices of the web, rather than just forming a layer that lays on the upper surface of the web without penetrating into the interstices of the web beneath the web's surface.

The desired pigmented, solvent soluble thermoplastic resin composition is a blend of pigmentation and a particular binder that is suitably plasticized, stabilized, and in solution during application to the web. A desirable pigmented, solvent soluble, thermoplastic resin composition contains solvents, solvent soluble thermoplastic resins, stabilizers, antistats, pigmentation, and plasticizers. The thermoplastic resins can include one or two or more of a copolymer vinyl chloride/vinyl acetate resin, vinylidene chloride, and/or a low molecular weight homopolymer polyvinyl chloride resin. When these vinyls are the thermoplastic resin component, this sometimes is called a solution vinyl composition. Other solvent soluble, thermoplastic resins that may be suitable in the composition of the present invention include cellulose resins like cellulose acetate propionate, cellulose acetate butyrate, blends of the foregoing cellulose ester resins, and acrylic resins. The solvents dissolve the thermoplastic resin components. The plasticizers soften the "hand", provide added stability, and aid in film forming. The stabilizers provide heat, light and color stability. The antistats lower the surface resistivity in order to reduce the attraction of dust particles. The pigmentation includes pigments predispersed in a binder system that is resin compatible with stabilizer and solvent, and thus eliminates the need to dye the web and the problems associated with dyeing polyester webs.

Among the solvents suitable for inclusion in the pigmented solution vinyl composition are acetone, methyl-ethyl ketone, methyl-isobutyl ketone, and toluene. Among the suitable plasticizers are phthalates and phosphates. Among the suitable stabilizers is a heat and light stabilizer such as dibutyltin dilaurate and a light and color stabilizer such as octoxybenzophenone. Among the suitable antistats is a MARKSTATE AL-26 TM brand antistat available from Argus Chemical Company. Organic or inorganic pigments are suitable and should be predispersed in a vinyl compatible system with stabilizer and solvent. Examples of suitable pigments include: titanium dioxide; phthalocyanines; perylenes; diarylides; tetrachloroisoindolinones; diazo condensations; carbon black; quinacridones; molybdates; iron oxides; chromates; chromium oxides and pearlescent rutile pigments.

In addition, ingredients such as fillers, soil repellents, and flame retardants can be added to the pigmented, solvent soluble, thermoplastic resin composition. The wet weight percentages of the ingredients in the composition are in the range of: about 5 to about 40 for the resins, about 10 to about 90 for the solvents, about zero to about 60 for the plasticizers, about 1 to about 5 for the stabilizers, and about 0 to about 45 for one or more of the pigments, fillers, antistats, soil repellents, and flame retardants.

Fillers suitable for inclusion in the composition include alumina hydrates, calcium carbonates, zinc oxides, and clays. Soil repellents suitable for inclusion in the composition include SCOTCHGARD TM sold by Minnesota Mining and Manufacturing Company (3M). Flame retardants suitable for inclusion in the composition include antimony oxides, borates, bromides, and phosphates.

The method of the present invention further preferably includes heating the web to cure the resin component of the composition and remove the solvent. Upon heating, substantially all of the solvents of the pigmented, solvent soluble thermoplsatic resin composition are removed, and the solids in the composition are visible on at least the planar side of the web to which the composition was applied and present throughout the interstices of the web. If the web is thin enough, the solids may be visible on both sides of the finished web after application to only one side. The heating step preferably is accomplished by feeding the web into a hot air dryer in which the web is heated by the application of streams of air maintained at temperatures ranging from about 230° F. to about 330° F. The heated air cures the composition applied to the web and dries the web by evaporating the solvent from the composition. Upon leaving the dryer, the web can be wound around a take-up roll or passed on to further apparatus for further processing.

In further accordance with the present invention, a roll of web to which the pigmented, solvent soluble, thermoplastic resin composition already has been applied from one planar surface in accordance with the present invention, has the composition applied in the same manner from the opposite planar surface by reversing the side of the web exposed to the composition and repeating the process of applying and curing the composition and drying the web. In some embodiments of the method using a rotogravure printer for example, the composition is applied to both sides of the web during a single pass of the web through the rotogravure printer. Such double-sided application is preferred to maintain the dimensional stability of the web and so prevent the finished web from curling up at the edges.

In still further accordance with the present invention, either surface of the polyester web to which the composition has already been applied and cured, can be embossed with any desired pattern by passing the web through a particular embossing apparatus, which applies heat and pressure to emboss a pattern into the web. A conventional multistation rotogravure printing press has been specially modified so that it can be used to emboss the louver material treated with the pigmented, solvent soluble, thermoplastic resin composition in accordance with the method of the present invention. The modification pertains to the hardness of the EPDM (ethylene propylene diene monomer) rubber roll which backs up the embossing roll. The backup rubber roll to the embossing cylinder must have a Shore A hardness of at least 90. The polyester web treated with the pigmented composition in accordance with the method of the present invention is preheated to approximately 275° F. before being embossed. Then just prior to passing between the embossing roll and the special hardness backup roll, the web is heated with infrared heaters to a temperature higher than 275° F., but not so high that the vinyl polymer melts. After passing between the embossing roll and the special hardness backup roll and being embossed, the embossed web then is rapidly cooled by being passed around 45° F. cooling drums before being wound into a roll.

Alternatively, a conventional multistation rotogravure printing press can be used to print the louver material treated with the pigmented, solvent soluble, thermoplastic resin composition in accordance with the method of the present invention.

In yet further accordance with the method of the present invention, a film can be laminated to the untreated planar surface of the nonwoven web, either directly or with the prior application of an adhesive. Similarly, the film can be laminated to a planar surface of the web that has been treated with the cured composition or to an untreated side of the web or separate films can be laminated to both sides of the web, whether one or both have been treated with the pigmented, solvent soluble, thermoplastic resin composition of the present invention.

In accordance with the product material of the present invention, a heat set nonwoven polyester web carries the solid residue of a pigmented, solvent soluble thermoplastic resin composition that has been heated and thus cured and dried to remove substantially all of the solvent. The composition preferably includes plasticizers, stabilizers, antistats, pigments, and either one or two or more of a polyvinyl chloride/vinyl acetate copolymer resin, vinylidene chloride, and/or a polyvinyl chloride resin. The louver material of the present invention has a basis weight in the range of about 3.5 oz/yd$^2$ to about 15 oz/yd$^2$. When exposed to the varying environmental test conditions as described above, the vertical louver product produced according to the present invention has $\frac{1}{8}$" maximum stretch, $\frac{1}{8}$" maximum shrinkage, no more than 10 degrees maximum twist, less than $\frac{1}{8}$" cupping, with no waviness visible, and no commercially unacceptable mottling.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the preferred embodiments of the present invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover the modifications and variations of this invention provided they come within the scope of the appended claims and their equivalents.

Figure 5:
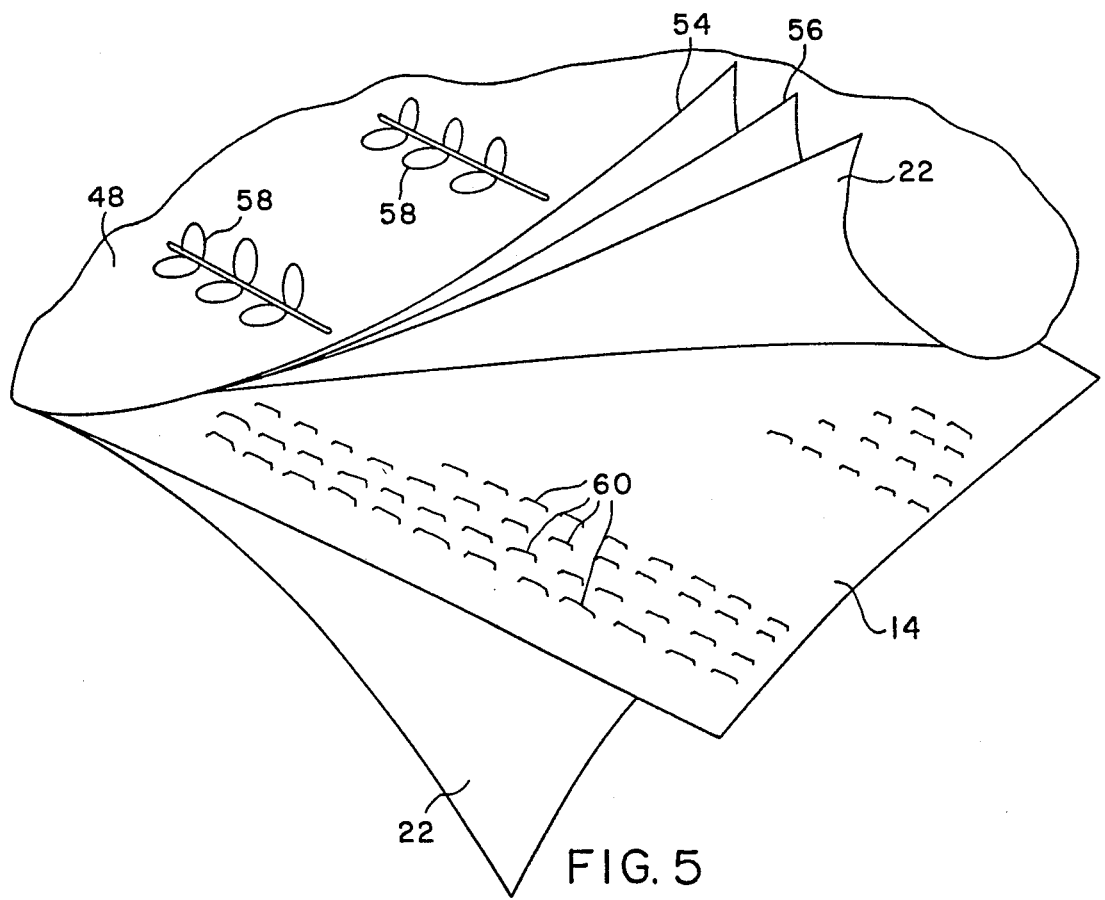
FIG. 5 schematically illustrates various embodiments of the finished product in accordance with the present invention.

In accordance with the present invention, a method is provided for producing a decorative product that is especially well suited for vertical louver window covering material, but also could be used as material for window or wall coverings. One of the starting materials for the method of the present invention is a web of nonwoven polyester material. The nonwoven web must be formed of polyester material. Acrylios for example will not satisfy the requirements of the present invention. The nonwoven web preferably consists of a polyester fabric with a minimum basis weight of 5.0 ounces per square yard (oz/sqyd). While polyester fabrics of lesser weight may be used, product quality may suffer depending on the decorative steps chosen. As shown in FIG. 5 for example, polyester web 14 can be provided with stitching 60 for purposes of reinforcing web 14. Batting for the nonwoven is prepared by conventional processes of carding, crosslapping, then stitchbonding with particular attention to web consistency and lapping procedures. The nonwoven polyester web should be heat set at a temperature in the range of from about 390 to 410 degrees Fahrenheit. Heat setting at lower temperatures allows too much shrinkage of the final louver product when exposed to environmental testing. Suitable nonwoven polyester fabrics which are available with appropriate heat setting include, but are not limited to, Tietex T-284D ™ from Tietex Corporation and C074GGD ™ from the W.S. Libbey Company.

If the nonwoven polyester web starting material has not already been heat set by the supplier of the web, the method of the present invention comprises the step of heat setting the nonwoven web. The nonwoven web preferably is heat set by mounting it on tenter pins and heating it at a temperature in the range of from about 390 to 410 degrees Fahrenheit. The web desirably is stitchbonded for purposes of reinforcing the web. The web should be stitchbonded before heat setting.

In accordance with the method of the present invention, a particular composition is applied to a heat set, nonwoven web of polyester material in order to give the web the "body" required for louver material that can be decorated as desired by embossing or printing, and to impart color to the louver material. As embodied herein, the particular composition contains the pigmentation necessary for coloring the louver material and components necessary for achieving the stiffness or "body" needed to make a vertical louver that can be embossed and printed without unacceptable cupping, mottling, twisting or color fading.

The composition of the present invention includes a blend of solvent soluble thermoplastic resin, solvent, stabilizers, pigmentation, and in some cases plasticizers. The thermoplastic resins preferably include vinyls like a low molecular weight homopolymer polyvinyl chloride resin, or a copolymer polyvinyl chloride/vinyl acetate resin, or vinylidene chloride, or blends of the foregoing vinyl resins. When these vinyls are the thermoplastic resin component, this sometimes is called a solution vinyl composition. Other thermoplastic resins that may be suitable in the composition of the present invention include cellulose resins like cellulose acetate propionate, cellulose acetate butyrate, blends of the foregoing cellulose resins, and acrylic resins. The solvents dissolve the thermoplastic resin components. The plasticizers soften the "hand", provide added stability, and aid in film forming. The stabilizers provide heat, light and color stability. The pigmentation includes pigments which preferably are predispersed in a binder system that is compatible with the thermoplastic resin and desirably includes stabilizer and solvent. The pigmentation eliminates the need to dye the web and the problems associated with dyeing polyester webs. In addition, the composition of the present invention further can include one or more of such ingredients as antistats, fillers, soil repellents, and flame retardants. The antistats lower the surface resistivity in order to reduce the attraction of dust particles.

The low molecular weight homopolymer polyvinyl chloride resin preferably should have an inherent viscosity of 0.82 and excellent heat and light stability. Examples are VC-95 TM from Borden and GG-1082 TM from Georgia Gulf. The copolymers of polyvinyl chloride/vinyl acetate provide the following advantageous properties: (1) the plasticizing effect of the vinyl acetate portion; (2) exceptional pigment wetting; and (3) excellent heat and light stability. A suitable copolymer of polyvinyl chloride/vinyl acetate available from Occidental Chemical is Oxy 1515 TM, a resin in with 13.8 bound vinyl acetate, inherent viscosity of 0.47, and a molecular weight k value of 48. Solvent soluble cellulose resins which may be suitable are available from Eastman Chemical Products Inc. of Kingsport, Tennessee and include CAP 482.2 TM cellose acetate propionate and CAB cellulose acetate butyrate. Solvent soluble acrylic resins which may be suitable are available from Rohm & Haas as A-11 TM acrylic resin and K-120 TM acrylic resin.

One or more of the following solvents are suitable for practicing the present invention: acetone, toluene, methylethyl ketone, and methyl-isobutyl ketone. Acetone is especially desirable.

Phthalate and phosphate plasticizers are suitable for the vinyl binders used in practicing the present invention, and the choice between them depends on the physical characteristics needed in the final product. Jayflex DINP TM is an example of a suitable diisononyl phthalate from Exxon Chemical. Phosflex 390 TM, isodecyl diphenyl phosphate from Akzo Chemie is an example of a plasticizer used for added flame retardant properties. It is believed that for use in the present invention, the cellulose or acrylic resins may be plasticized by the addition of a plasticizer, but do not necessarily need to be plasticized, as do the vinyl resins.

A suitable stabilizer for use in practicing the present invention includes a heat stabilizer such as dibutyltin dilaurate. Cyasorb UV-531 TM light stabilizer from Cyanamid is an example of an appropriate octoxybenzophenone which can be used for increased light stability. Syloid 234 TM is an example of a silica aerogel from Davison Chemical which can be used as a dulling agent in the composition of the present invention.

Antistats dissipate electric charge and so reduce the tendency of the louver material to pick up dirt and dust. An example of a preferred antistat for practicing the present invention is sold by Argus Chemical Company under the MARKSTAT AL-26 TM brand MARKSTAT AL-26 TM is an example of a cationic quaternary antistatic additive.

Pigmentation of the composition is effected using organic or inorganic pigments, which are preferably predispersed in a thermoplastic resin compatible binder system with stabilizer and solvent. Conventional compounding techniques for producing ink concentrates can be used in-house, or such concentrates can be obtained from commercial suppliers. Typical examples of these pigment concentrates are Martin Piccard's vinyl printing ink line such as M-720 TM, M-1903 TM. Inorganic pigments, which include titanium dioxide, are one class of pigments which are preferred for practicing the present invention. However, one or more of the following pigments are suitable for practicing the present invention: organic pigments such as phthalocyanines, including phthalocyanine blues and greens, and perylenes such as perylene red; diarylides; tetrachloroisoindolinones; diazo condensations; carbon black; quinacridones; molybdates; iron oxides; chromates; chromium oxides; and pearlescent rutile pigments.

In addition, the composition of the present invention further preferably includes one or more of such ingredients as fillers, soil repellents, and flame retardants. One or more of the following fillers is suitable for practicing the present invention: alumina hydrates, calcium carbonates, zinc oxides, and clays. An example of an effective soil repellent is sold by Minnesota Mining and Manufacturing Company (3M) under the SCOTCHGARD TM brand name. One or more of the following flame retardants is suitable for practicing the present invention: antimony oxides, borates, bromides, and phosphates.

Preferably, the weight percentages of the ingredients in the composition are: about 10 to about 90 for the solvents, about 5 to about 40 for the resins, about zero to about 60 for the plasticizers, about 1 to about 5 for the stabilizers, and about 0 to about 45 for one or more of the pigments, fillers, antistats, soil repellents, and flame retardants.

In one preferred embodiment of the pigmented base solution vinyl composition of the present invention, the wet weight percentages are: about 70 for the solvents, about 20 for the resins, about 7 for the plasticizers, about 1 for the stabilizer, about 0.3 for antistat, and about 0.2 for white ink concentrate which includes solvents and stabilizers. Colored inks would make up the balance.

A preferred embodiment of the composition including a pigment preferably comprises between about 55% to about 98.5% by weight of the base solution vinyl and about 1.5% to about 45% by weight of the ink concentrate including the pigment. Another preferred embodiment of the composition which includes between about 65% to about 75% by weight of the base solution vinyl and about 25% to about 35% by weight of the ink concentrate or pigment. In this latter embodiment the pigment preferably is white ink.

In preparing the pigmented, solvent soluble, thermoplastic resin composition for the present invention, the solvents are added to a conventional steam jacketed mixing tank with high shear mixing blades, such as a Cowles blade mixer. There, the solvents are heated to 70 degrees Centigrade. Fifty (50) pound increments of resin are added to the solvent, and the mixture of resins and solvents is agitated by the mixer during these additions. Heating occurs during agitation over a period of 20 to 30 minutes until the mixture of resins and solvents has returned to 70 degrees Centigrade. After the resins/solvent mixture has returned to 70 degrees Centigrade, the mixture is checked for dissolution. Agitation continues while plasticizers, stabilizers, antistatic agents, fillers, and pigment concentrates are added, and agitation continues for a further 15 minutes after they have been added. The composition is then containerized until it is to be applied. Just prior to application, the composition should be stirred.

As noted above, the method of the present invention calls for applying a pigmented, solvent soluble, thermoplastic resin composition to one planar surface of the heat set nonwoven polyester web. A preferred embodiment of a configuration of apparatus suitable for practicing the method of the present invention is shown schematically in FIGS. 1 and 6 and is represented generally by the numerals 10 and 100, respectively. As embodied herein and shown in FIG. 1 for example, a rotatable unwind and mandrel 12 supports a continuous winding of nonwoven polyester web 14, which already has been heat set as described above. Polyester web 14 preferably extends along the length of mandrel 12 for several feet and supplies a continuous web of nonwoven material that is several hundred feet in length. Web 14 moves in the direction of arrows 16 around several rolls 18. Tension is controlled in the web as it is being removed from mandrel 12.

Figure 1:
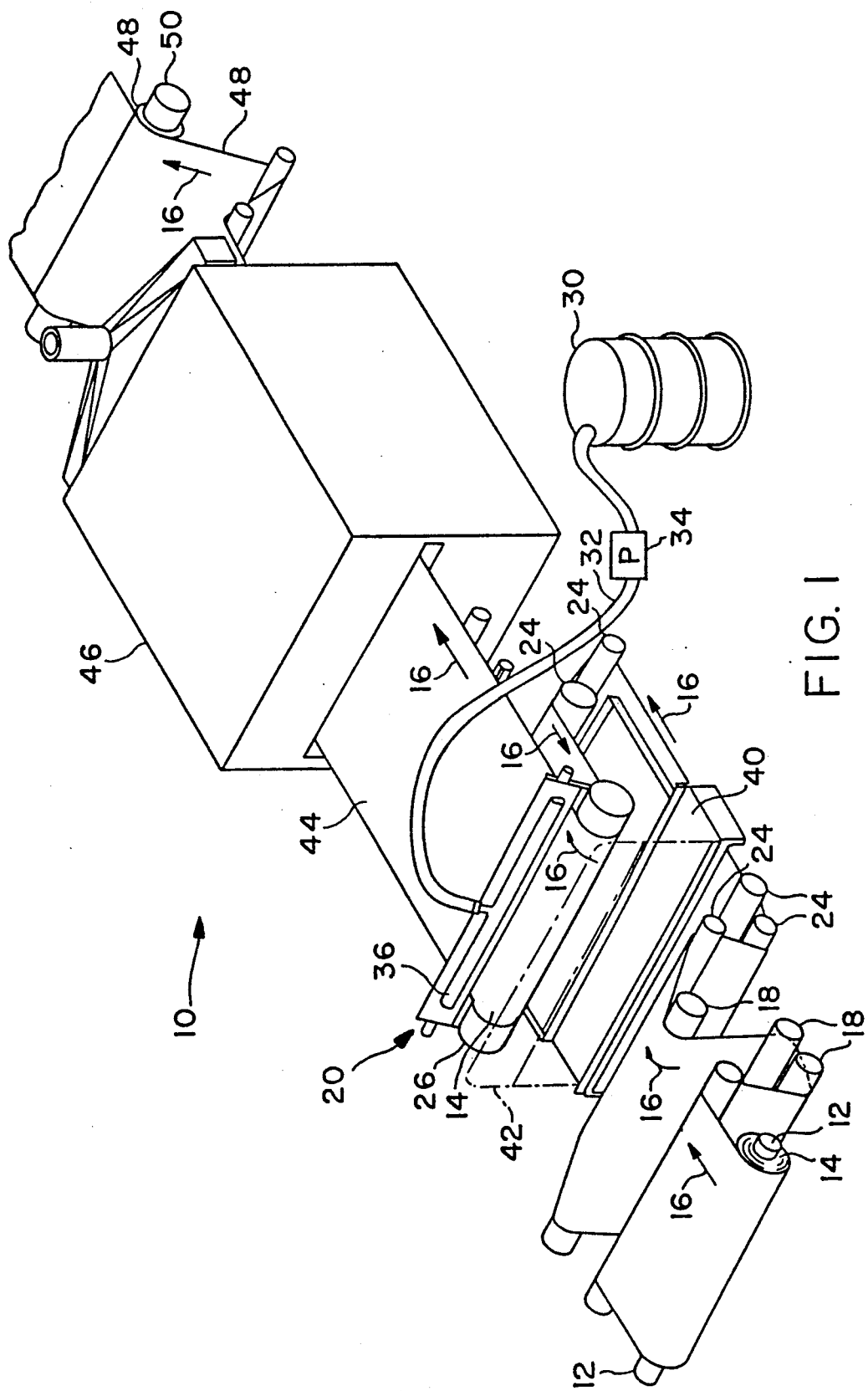
FIG. 1 illustrates a perspective elevation view of embodiments of apparatus configured for practicing the method of the present invention.
Figure 3:
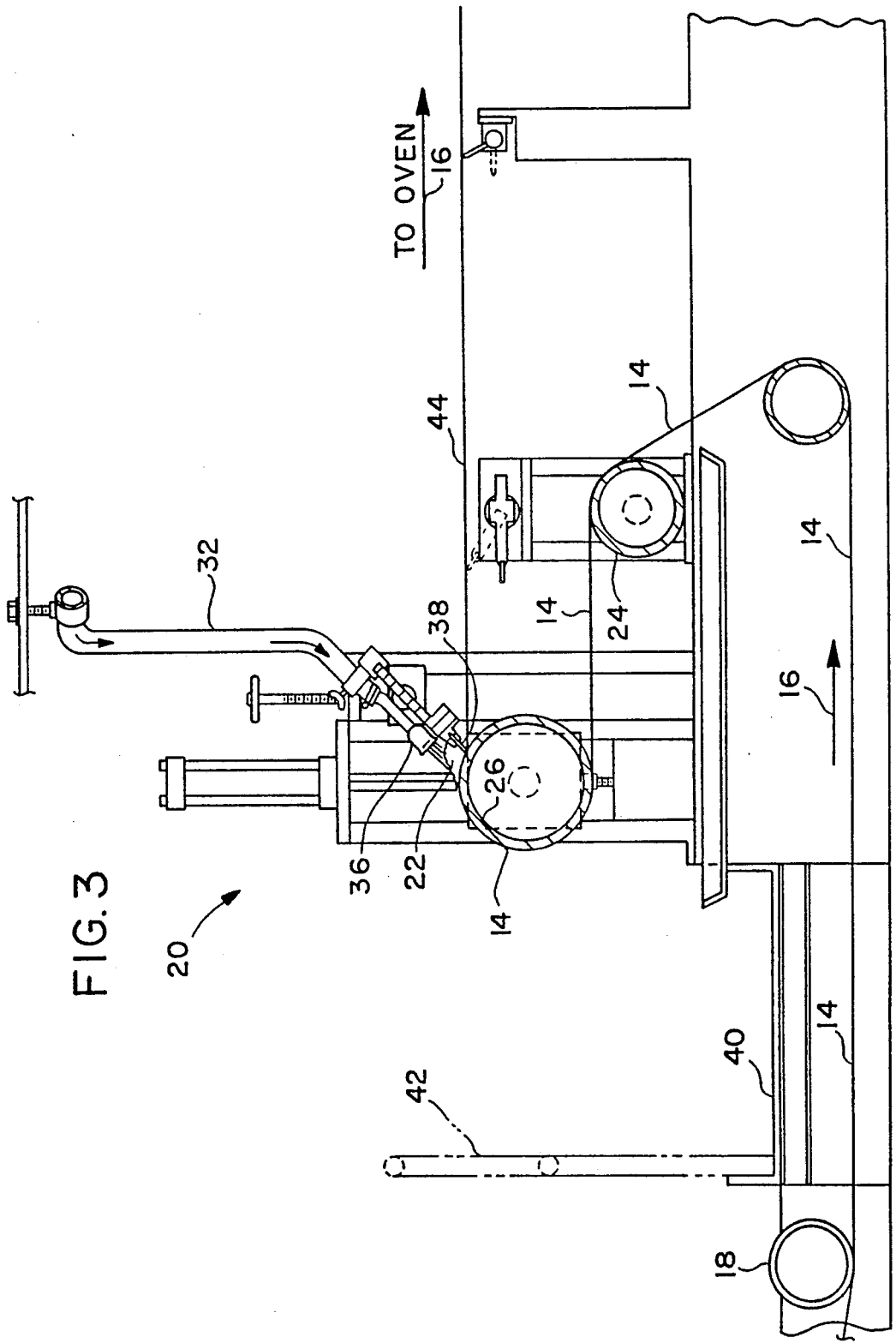
FIGS. 3 and 4 illustrate enlarged side plan views of components used in practicing the method of the present invention.
Figure 4:
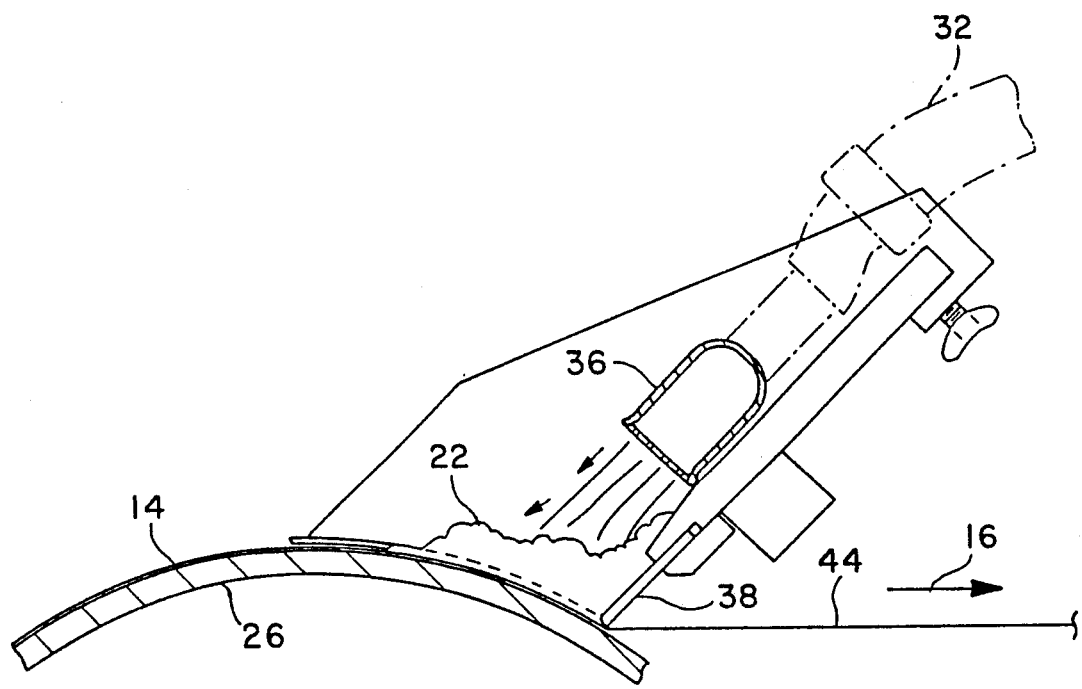

Web run 14 eventually arrives at the site of an apparatus for applying the composition, which apparatus is schematically illustrated in FIGS. 3 and 4 by the designating numeral 22. This apparatus for applying composition 22 is indicated generally in FIGS. 1 and 3 by the numeral 20. As shown in some detail in FIGS. 3 and 4 for example, apparatus 20 can be a knife-over-roll applicator which includes a smooth surface support roll 26. A conventional constant web tension device, such as an in-line tenter frame (not shown) maintains constant cross web tension as web 14 moves past a coating head 36 of the applicator apparatus. In this way, slack can be taken up across the web of material 14 and dimensional stability are maintained. As shown in FIG. 1 for example, idler rolls 24 and tension-adjusting rolls 12, 18 are also provided. As shown in FIG. 1 for example, the composition to be applied to nonwoven web 14 using knife-over-roll apparatus 20 is stored in a receptacle such as a metal drum 30. A pump 34 supplies composition 22 under pressure through a flexible hose 32 to a coating head or nozzle 36. As shown in FIGS. 1 and 3 for example, a platform 40 is available to permit technicians to view the application process, and a guard railing 42 is shown in phantom in FIGS. 1 and 3 to avoid obscuring the illustration of apparatus 20.

As untreated nonwoven web 14 passes over support roll 26, composition 22 is discharged from head 36 and applied to the upper surface of the web. Typically, the amount of the composition discharged through head 36 is in the range of from about 10 lb/min to about 20 lb/min. The composition initially contacts the upper surface of the web, and pressure is applied to the composition to force it into the interstices of the nonwoven material forming the web. As shown in FIGS. 4 and 5 for example, composition 22 contacts the upper surface of nonwoven web 14 and penetrates into the web. Excess composition is removed from the upper surface of the web. As web 14 moves in the direction of arrow 16 at a rate preferably in the range of about 30 feet per minute to about 100 feet per minute, a rigid blade 38 removes excess composition 22 from the upper surface of web 14 and applies pressure to disperse the composition into the interstices of the nonwoven material forming web 14. Thus, the composition penetrates into the interstices of the web, rather than just forming a layer that lays on the upper surface of the web without penetrating into the interstices of the web beneath the web's surface.

Other conventional apparatus are suitable for applying the composition of the present invention to the nonwoven stitchbonded web. Such suitable alternative apparatus include a reverse roll coating head, a rotary screen, a flood-coating head, and an engraved rotogravure coating head. Several different types of applicators are disclosed for example in U.S. Pat. No. 3,844,813 to Leonard et al, which Patent is hereby incorporated herein by reference. A rotogravure printer for example is especially well suited for fabrics which are very thin and uses an engraved cylinder to apply the composition to the fabric. A knife or blade disposed on top of the engraved cylinder ensures an even distribution of the composition on the cylinder for application of the composition to the web. When the composition is applied using a rotogravure printer, the solvent to resin ratio in the composition is increased to about six parts solvent to one part resin. This thins the composition. Moreover, the rotogravure printer can apply the coating to both sides of the web during a single pass of the web through the printer. The double-sided application is preferred to maintain the dimensional stability of the web and so prevent the finished web from "cupping," i.e., curling up at the edges. As shown in FIG. 5 for example a coating of composition 22 has been applied to opposite sides of web 14.

In still further accordance with the present invention, after the composition is applied to the nonwoven web, the nonwoven web is heated to remove substantially all of the solvent and set the composition. Upon heating, the composition cures and imparts a permanent finish, which is visible from at least on the planar surface of the web to which the composition was applied. The solids in the composition are deposited throughout the interstices of the web, and are not just laying on the surface of the nonwoven polyester web. If the web is thin enough, the cured thermoplastic resin composition may form a solid finish visible from both sides of the web. As embodied herein and shown in FIG. 1 for example, the run of web to which the composition has been applied is labeled by the numeral 44. Applicated web 44 is fed into a hot air dryer 46 in which the web is heated by the application of streams of air heated to temperatures ranging from about 230° F. to about 330° F. Desirably, the web is heated at temperatures ranging from about 275° F. to about 300 ° F. The heat cures the resin and dries the web by evaporating the solvent. It should be noted that the heat stabilizer in the composition becomes critical because it permits this heating to occur without yellowing the vinyl components and adversely affecting the appearance of the louver material. The fabric is checked for solvent retention, and 0.9% retained solvent by weight of the louver material is generally considered acceptable as substantially all of the solvent has been removed. If solvent levels test outside the acceptable limit, the fabric may be dried further at this point. The dry weight of the composition solids remaining with the web after heating to cure and dry, may range from 1.5 to 6.0 ounces per square yard, depending upon the amount of solids in the composition and the basis weight of the web. Heavier fabric webs tend to absorb and retain more of the composition.

The amount of solvent to be removed from the composition is one factor which determines the rate at which the web moves forward through dryer 46 in the direction of arrow 16 as shown for example in FIG. 1. The more solvent to be removed by the heating step discussed above for curing and drying, the slower the web travels. Other factors which affect the rate of travel of the web include the degree of opacity desired in the finished web, the weight desired in the finished web, the vinyl resin's cure temperature, and the amount of solvent to be removed. Upon leaving dryer 46, the web is designated by the numeral 48 (FIGS. 1 and 5) and is wound around take-up roll 50 or passed on for further processing (described hereafter).

In yet further accordance with the present invention, a roll of web 48 which already has been treated on one planar surface in accordance with the invention, as described above, can be treated in the same manner on the opposite planar surface by reversing the side of the web exposed to the composition and repeating the steps set forth above. Moreover, the composition applied to the opposite side of the web can be the same formulation of the composition or a different composition formulation. For example, the composition on one side of the web can be a different color and/or opacity than the composition used to treat the opposite planar surface of the web. Furthermore, the process of the present invention permits a white composition to be applied on the web either before or after a dark colored composition has been applied to the opposite side.

In still further accordance with the present invention, a film can be laminated to the untreated planar surface of the nonwoven web, either directly or preferably with the application of an adhesive. As shown for example in FIG. 5, a film 54 can be laminated to the planar surface of the web that has been treated with the cured composition. The film can be laminated either directly or preferably by applying an adhesive 56 to one side of the louver to which the composition has been applied and cured.

In still further accordance with the present invention, and as shown in FIG. 5 for example, the surface of the web to which the composition was applied and cured, can be embossed with any desired pattern. In FIG. 5, an embossed pattern 58 is shown as an example. In other embodiments, the embossed pattern mimics the appearance of the surface texture of fine woven or nonwoven fabrics. Embossing is accomplished by passing web 48 through a conventional embossing apparatus that has been specially modified to emboss the louver material produced by the method of the present invention in a manner that permits the embossed louver material to retain superior dimensional stability and rigidity.

Embossing has been tried without success on aqueous acrylic latex coated vertical louver material. The material with the acrylic finish lost its stiffness after embossing, yielding an unsuitable product due to twisting and cupping, and unsatisfactory embossing retention. In contrast to the aqueous acrylic latex coated vertical louver material, the surface of the louver material treated with the pigmented, solvent soluble, thermoplastic resin composition in accordance with the method of the present invention, makes an excellent base for embossing and printing.

In accordance with the present invention, a conventional multistation rotogravure printing press, such as is available from LEMBO Corporation of Patterson, New Jersey and Midland, Ontario (Canada), has been specially modified so that it can be used to emboss the louver material treated with the pigmented, solvent soluble, thermoplastic resin composition in accordance with the method of the present invention. The modification pertains to the hardness of the EPDM (ethylene propylene diene monomer) rubber roll which opposes, i.e., "backs", the embossing roll. Louver material produced with the pigmented solution vinyl composition as described above and embossed using a LEMBO rotogravure with a rubber roll with a Shore A hardness of 70 backing up the embossing roll displayed cupping in excess of $\frac{1}{8}''$ per 3.5" vane, and thus was unsatisfactory. By contrast, for purposes of the present invention, the backup rubber roll to the embossing cylinder must have a Shore A hardness of at least 90.

In accordance with the present invention, the louver material treated with the pigmented, solvent soluble, thermoplastic resin composition in accordance with the method of the present invention is preheated to approximately 275 degrees Fahrenheit before being embossed. As embodied herein and shown schematically in FIG. 6 for example, web 48 of louver material produced in accordance with the method of the present invention moves in the direction of arrow 16 around a 48 inch diameter heating drum and is preheated to approximately 275 degrees Fahrenheit by a Quartz electric oven 64. Then just prior to passing between the embossing roll 66 and the special hardness (Shore A hardness of at least 90) backup roll 68, the web of louver material is further preheated with infrared heaters 70 to a temperature higher than 275 degrees Fahrenheit. However, the temperature is not permitted to become so high that the composition solids melt.

Figure 6:
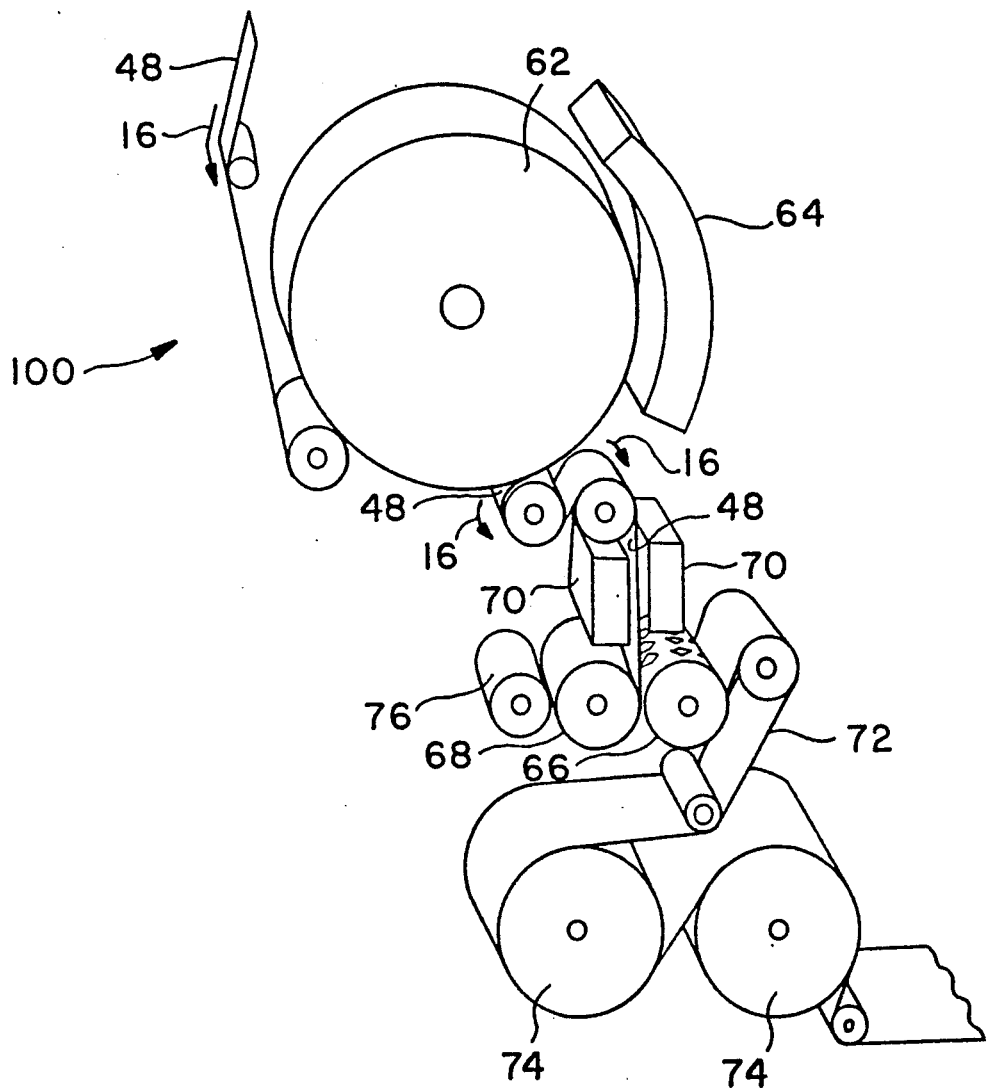
FIG. 6 schematically illustrates a perspective view of a preferred embodiment of the embossing portion of the method of the present invention.

As shown schematically in FIG. 6 for example, web 48 passes between a pair of opposed infrared heaters 70, such as either Irex heaters or Quartz electric oven heaters. In order to cool the surface of rubber back-up roll 68 during the embossing operation, water is supplied to the surface of rubber back-up roll 68 from a cooling pan (not shown). An eight and one-half inch diameter wiper (a.k.a. squeegee) roll 76 can be applied with controlled varying amounts of pressure against back-up roll 68 in order to remove liquid (such as cooling water for example) from the surface of rubber back-up roll 68. The engraved embossing roll ranges from a depth of emboss of 0.0010" to 0.0700, depending on the pattern desired. The depths of the embossed pattern that can be imparted into the product of the present invention by the embossing operation is in this same range.

After passing between the embossing roll 66 and the special hardness backup roll 68 and being embossed, the embossed louver material 72 is rapidly cooled. As shown schematically in FIG. 6 for example, embossed louver material 72 travels at a speed of about 30 feet per minute over a pair of adjacent 24 inch diameter cooling drums 74 maintained at a temperature of about 45° F. by circulation of a glycol/water mixture. After the embossed louver material has been cooled, it can be wound into a roll for inspection and slitting into vanes of varying widths, typically 2.0 to 5.0 inches in width. The industry standard width for a vertical louver vane is 3.5 inches.

The louver material treated with the pigmented, solvent soluble, thermoplastic resin composition in accordance with the method of the present invention can be printed on a conventional multistation rotogravure printing press. Suitable louver product has been decorated with printing by using printing cylinders engraved as 120 line screen to a depth of 50 microns plus/-minus 2.5 microns, with a rubber roll backup roll at 70 Shore A hardness. As in conventional vinyl processing, the printing of the fabric occurs in steps depending on pattern and color, with drying of the print between each station.

In accordance with the finished product of the present invention, a nonwoven stitchbond polyester web is provided. After the pigmented thermoplastic resin composition, such as a solution vinyl composition, has been applied to at least one side of the nonwoven polyester web and heated to cure the resin and remove substantially all of the solvent, the resulting louver material has a basis weight in the range of about 3.5 ounces per square yard to about 15 ounces per square yard. The cured and dried composition preferably includes a polyvinyl chloride/vinyl acetate copolymer resin, a polyvinyl chloride homopolymer resin, heat stabilizers, light stabilizers, antistats, and pigments. The thermoplastic resins preferably include vinyls like one or more taken from the group consisting of a low molecular weight homopolymer polyvinyl chloride resin, or vinylidene chloride, or a copolymer polyvinyl chloride/vinyl acetate resin, or blends of the foregoing vinyl resins. Other solvent soluble thermoplastic resins that may be suitable in the composition of the present invention include cellulose resins like cellulose acetate propionate, cellulose acetate butyrate, blends of the foregoing cellulose resins, and solvent soluble acrylic resins. The pigmented, solvent soluble, thermoplastic resin composition can be applied to only one side of the nonwoven web or to both sides of the nonwoven web, as desired. The finished web can have a film laminated on one or both sides of the web and either on a coated side of the web or a noncoated side of the web. The finished web can be embossed on the side of the web to which the composition has been applied. The finished web can have a contrasting color solvent soluble, thermoplastic resin composition on the opposite sides of the web. The finished web can be cut into strips of any length and width specified by the customer to suit its particular requirements for a vertical louver product, a window covering product or a wall covering product. Typically, the lengths used as louvers in vertical blinds range from around two feet to seven (7) feet long and typical widths are 2, 3.5 or 5 inches wide. The web or fabric of the present invention maintains the appearance of cloth with an opaque color wash. The composition solids imbedded into the web or fabric during the curing step of the manufacturing process, differ in appearance depending on the weight and surface of the web or fabric. A lighter weight web with a rough surface area and porosity will allow the composition to enter the web more deeply than a smooth surfaced heavy weight web which may allow more of the composition to remain near the surface. The product of the present invention may be printed extensively, has a minimal appearance of the mottling due to web density, has an improved lightfastness of 150 hours minimum, and may be embossed. When exposed to the varying environmental test conditions as described above, the louver product produced according to the present invention has ⅛" maximum stretch, ⅛" maximum shrinkage, no more than 10 degrees maximum twist, less than ⅛" cupping, with no waviness visible, and no more mottling than is commercially acceptable.

The following examples are provided as illustrations of specific embodiments of the invention, and the invention is not intended to be restricted to the examples.

EXAMPLE 1

Figure 2:
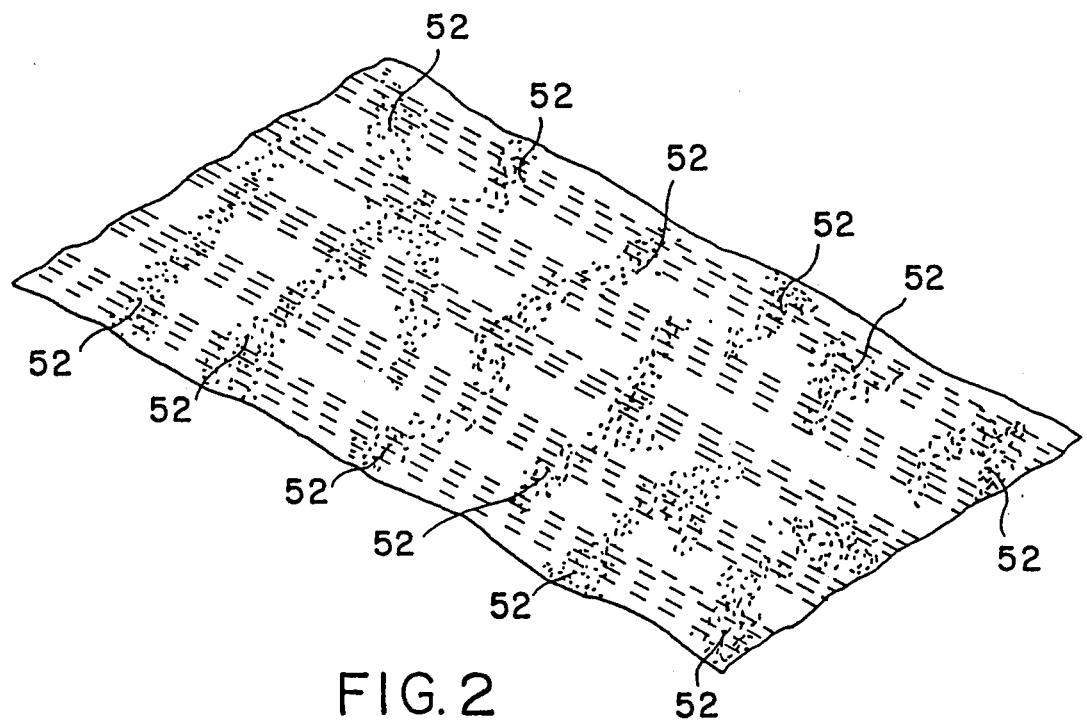
FIG. 2 illustrates an embodiment of nonwoven fabric that is shaded to illustrate the mottling effect due to density variations in the fabric.

A nonwoven stitchbonded polyester fabric having a basis weight of about 6.5 ounces per square yard and heat set to 410 degrees Fahrenheit was coated on both planar sides with a pigmented composition containing approximately 30% solids. The coating consisted of the following approximate amounts in terms of the weight percentages of the composition on a wet basis: 70% solvents consisting of about 22% methyl ethyl ketone, about 22% toluene, and about 26% acetone; 20% resins consisting of about 5% polyvinyl chloride resin and about 15% polyvinyl chloride/vinyl acetate copolymer resin; 7% isodecyl diphenyl phosphate plasticizers; 1% dibutyl tin dilaurate stabilizer; 0.3% cationic quaternary antistat; and 1.7% pigmentation from ink concentrates. This 1.7% of color consisted of the following approximate amounts in terms of the weight percentages of the pigmentation on a wet basis: 87.6% titanium oxide white ink, 6.3% M-1757 molybdate orange ink, 3.4% M-1903 chrome yellow ink, 1.7% M-720 quinacridone red ink, and 1.2% M-781 phthalocyanine blue ink. The inks may be obtained from Martin Piccard, Inc., Carlstadt, New Jersey 07072. The resulting mauve colored solution vinyl composition was applied using a conventional knife-over-roll at a speed of about 25 yards per minute and cured and dried at a temperature of 275-300 degrees Fahrenheit. The resulting dry weight of the louver material fabric was 10.0 ounces per square yard. The original nonwoven web exhibited the mottling as shown in FIG. 2 by the mottled portions 52. The web treated according to the present invention eliminated the mottled appearance of the untreated web.

The louver material was subsequently embossed on a multistation Lembo rotogravure printing press by the following method, as shown schematically in FIG. 6. The web of louver material traveled over a heated drum set at 275 degrees Fahrenheit. Just prior to entering the embossing section, the heated web passed vertically between a pair of opposed Quartz heaters (Model 77-089-2 from Fostoria Industries) set to a power output of approximately 60-70%. The embossing section consisted of a conventional steel to rubber embossing set up, except for the EPDM rubber back-up roll, which possessed a Shore A hardness of 90. The embossing roll was engraved in a "linen" design pattern to depths ranging from 0.010 inches to 0.025 inches. The embossed web continued at a speed of approximately 30 yards per minute over cooling cans containing 45 degree Fahrenheit glycol and water. The material was then wound into a roll for inspection and slitting into 3.5 inch vanes.

Applying tests described above, the maximum shrinkage was 1/16", maximum stretch was 1/16", the maximum twist was 5 degrees, lightfastness was longer than 200 hours, and no waviness, cupping or crocking was observed.

EXAMPLE 2

A nonwoven stitchbonded polyester fabric having a basis weight of about 7.5 ounces per square yard and heat set to 410 degrees Fahrenheit, was coated on both planar sides with a pigmented solution vinyl composition containing approximately 55% solids. The composition consisted of the following approximate amounts in terms of the weight percentages of the composition on a wet basis: 45% solvents of the same kind and in the same relative proportions as in Example 1; 20% resins of the same kind and in the same relative proportions as in Example 1; 7% isodecyl diphenyl phosphate plasticizers; 1% dibutyl tin dilaurate stabilizers; 0.3% cationic quaternary antistat; and 25% pearl pigment such as SuperSilk ™ from Mearl Corp., and 0.5white ink concentrate. The resulting off-white colored composition was applied using a conventional knife-over-roll at a speed of about 25 yards per minute and cured and dried at a temperature in the range of from about 275-300 degrees Fahrenheit. The resulting dry weight of the louver material fabric was 10.75 ounces per square yard. The original nonwoven web exhibited the mottling as shown in FIG. 2 by the mottled portions 52. The web treated according to the present invention eliminated the mottled appearance of the untreated web.

The louver material fabric was subsequently embossed on a multistation Lembo rotogravure printing press by the method described in Example 1. The embossing roll was engraved in a "rattan" design pattern to depths ranging from 0.010 inches to 0.045 inches. The embossed web continued over cooling cans containing 45 degrees F. glycol and water at a speed of approximately 30 yards per minute. The material was then wound into a roll for inspection and slitting into 3.5 inch vanes.

Applying tests described above, the maximum shrinkage was 1/16", lightfastness was longer than 200 hours, and no waviness, stretching, twisting, cupping or crocking was observed.

EXAMPLE 3

A nonwoven stitchbonded polyester fabric having a basis weight of about 6.5 ounces per square yard and heat set to 410° F. was coated on both planar sides with a pigmented solution vinyl composition containing approximately 30% solids. The composition was the same as in Example 1 with the exception of the kind of plasticizer and the kind of ink. The plasticizer was diisononyl phthalate, and the ink consisted only of white ink concentrate. The resulting white composition was applied using a conventional knife-over-roll at a speed of about 25 yards per minute and cured and dried at a temperature of 275°-300° F. The resulting dry weight of the fabric was 9.8 ounces per square yard. The original nonwoven web exhibited the mottling as shown in FIG. 2 by the mottled portions 52. The web treated according to the present invention eliminated the mottled appearance of the untreated web.

The coated nonwoven was subsequently printed and embossed in a multistation Lembo printing press. A four station print in a decorative pattern was printed via conventional rotogravure transfer of ink to the substrate. After the final printing station dryer, the printed fabric traveled in-line over a heated drum set at 275° F. The heated web was embossed as described in Example 1. The rubber back-up EPDM roll possessed a Shore A hardness of 90. The embossing roll was engraved in the "bark" pattern to a depth of 0.010 inches to 0.035 inches. The fabric continued over cooling rolls as described in Example 1.

Applying tests described above, the maximum stretch was 1/16", lightfastness was longer than 200 hours, and no waviness, shrinking, twisting, cupping or crocking was observed.

What is claimed is:

1. A method for producing an improved embossed wall or window covering product, the method comprising:
   (a) applying a heat stabilized pigmented thermoplastic resin composition to a heat set nonwoven polyester web;
   (b) curing the thermoplastic resin composition;
   (c) embossing the web at a temperature of at least 275° F. against a rubber back-up roll having a Shore A hardness of at least 90 to produce a predetermined embossed pattern in the web; and
   (d) cooling the embossed web while retaining the predetermined embossed pattern therein.

2. A method as in claim 1, wherein said embossing step includes the steps of:
   (a) preheating the web to a temperature of about 275° F.;
   (b) pressing the web between the rubber back-up roll having a Shore A hardness of at least 90 and the embossing roll to emboss a pattern into the web;
   (c) cooling the rubber back-up roll during the step of pressing the web between the embossing roll and the rubber back-up roll; and
   (d) rapidly cooling the embossed web.

3. A method as in claim 2, wherein:
   (e) the depth of said pattern embossed into the web ranges from 0.010 inches to 0.070 inches.

4. A method as in claim 2, wherein:
   said preheating step includes passing the web between a pair of opposed heating units to heat both sides of the web just prior to pressing the web between the embossing roll and the rubber back-up roll having a Shore A hardness of at least 90 to emboss a pattern into the web.

5. A method as in claim 4, wherein:
   the region between said pair of opposed heating units is maintained at a temperature ranging from about 290° F. to a temperature that is insufficient to melt the resin solids of the composition set on the web.

6. A method as in claim 1, wherein said composition includes:
   i) thermoplastic resin taken from the group consisting of: low molecular weight polyvinyl chloride homopolymer, polyvinyl chloride/vinyl acetate copolymer, vinylidene chloride, and a blend of two or more of the foregoing,
   ii) solvent,
   iii) plasticizer,
   iv) heat stabilizer, and
   v) pigment.

7. A method as in claim 6, wherein:
   said curing step includes passing the web through a hot air oven to cure the thermoplastic resins and remove substantially all of the solvents from the pigmented thermoplastic resin composition.

8. A method as in claim 7, wherein:
   said oven is maintained at a temperature ranging from about 275° F. to about 300° F.

9. A method as in claim 1, wherein said thermoplastic resin composition includes:
   i) thermoplastic resin taken from the group consisting of: cellulose acetate propionate, cellulose acetate butyrate, solvent soluble acrylic resins, and a blend of two more of the foregoing,
   ii) solvent,
   iii) heat stabilizer, and
   iv) pigment predispersed in a binder system that is compatible with said resins, solvent and stabilizer.

10. A method as in claim 9, wherein:
said curing step includes passing the web through a hot air oven to cure the thermoplastic resins and remove substantially all of the solvents from the pigmented thermoplastic resin composition.

11. A method as in claim 1, wherein:
(e) said web has been heat set at a temperature in the range of 390° F. to 410° F.

12. A method for producing an improved embossed wall or window covering product, the method comprising:
(a) applying a heat stabilized, pigmented, solvent soluble, thermoplastic resin composition to one planar surface of an heat set nonwoven polyester web, wherein said composition includes:
   i) low molecular weight homopolymer polyvinyl chloride resin,
   ii) copolymer polyvinyl chloride/vinyl acetate resin,
   iii) solvent,
   iv) plasticizer,
   v) pigment predispersed in a vinyl compatible binder system with solvent and stabilizer,
   vi) heat stabilizer,
   vii) antistat, and
   viii) light stabilizer;
(b) heating the web to remove substantially all of the solvents and cure the thermoplastic resins;
(c) cooling the web;
(d) applying a second heat stabilized, pigmented, solvent soluble. thermoplastic resin composition to the opposite planar surface of the nonwoven web;
(e) heating the web a second time to remove substantially all of the solvents and cure the thermoplastic resin of said second composition;
(f) preheating the twice-cured web to a temperature of about 275° F.;
(g) further heating the twice-cured web just prior to pressing the web between an embossing roll and a rubber back-up roll having a Shore A hardness of at least 90 to emboss a pattern into the web, wherein said further heating is at a temperature ranging from about 290° F. to a temperature that is insufficient to melt the cured resin solids and wherein said back-up roll is being cooled during said embossing; and
(h) rapidly cooling the embossed web.

13. A method for producing an improved wall or window covering product, the method comprising:
(a) applying a thermoplastic resin dissolved in a solvent to a heat set non-woven polyester web;
(b) curing the thermoplastic resin; and
(c) embossing the web against a rubber back-up roll having a Shore A hardness of at least about 90 to produce a predetermined embossed pattern in the web.

14. A method as in claim 13, wherein said thermoplastic resin is chosen from the group consisting of polyvinyl chloride derivatives.

15. A method as in claim 13, wherein said embossing step includes the step of:
(a) preheating the web to a temperature sufficient to cure the resin and effect evaporation of said solvent;
(b) pressing the web between the rubber back-up roll and an embossing roll to emboss a pattern into the web;
(c) cooling the rubber back-up roll during the step of pressing the web between the embossing roll and the rubber back-up roll; and
(d) cooling the embossed web.

16. A method as in claim 13, wherein said non-woven polyester web has a dry basis weight in the range of 1.5 oz/yd$^2$ to 15 oz/yd$^2$.

* * * * *